Dec. 17, 1968 J. P. O'NEILL 3,416,749

MAGNETIC HYSTERESIS APPARATUS

Filed May 10, 1965 4 Sheets-Sheet 1

James P. O'Neill,
INVENTOR.
BY.

Jerry A. Dinardo

AGENT.

MAGNETIC HYSTERESIS APPARATUS

Filed May 10, 1965 4 Sheets-Sheet 2

James P. O'Neill,
INVENTOR
BY.
Jerry A. Dinardo
AGENT.

MAGNETIC HYSTERESIS APPARATUS

Filed May 10, 1965

James P. O'Neill,
INVENTOR.
BY.
Jerry A. Dinardo
AGENT.

Dec. 17, 1968 J. P. O'NEILL 3,416,749

MAGNETIC HYSTERESIS APPARATUS

Filed May 10, 1965 4 Sheets-Sheet 4

James P. O'Neill,
INVENTOR.
BY.

Jerry A. Dinardo
AGENT.

United States Patent Office 3,416,749
Patented Dec. 17, 1968

3,416,749
MAGNETIC HYSTERESIS APPARATUS
James P. O'Neill, Playa Del Rey, Calif., assignor to TRW Inc., Redondo Beach, Calif., a corporation of Ohio
Filed May 10, 1965, Ser. No. 454,365
10 Claims. (Cl. 244—1)

ABSTRACT OF THE DISCLOSURE

Magnetic damping is achieved when a magnetizable member having large magnetic hysteresis characteristics is moved through a magnetic field produced by poles of alternating polarity. Maximum damping action is achieved for small increments of movement of said magnetizable member and the damping effect is independent of the rate of movement.

This invention relates to magnetic hysteresis apparatus for producing a force between two members in resistance to a change in relative position and for dissipating energy as heat generated in ferromagnetic materials when the magnitude and/or orientation of magnetization is changed due to relative motion between a magnetizing device and a variably magnetized member. Such magnetic hysteresis apparatus may be used as drives, brakes, and dampers, for example.

In the usual application of magnetic hysteresis to the damping of an oscillatory motion, such as that required to reduce the librations of a gravity-gradient stabilized satellite, a ring of ferromagnetic material is magnetized by a bar magnet that produces north-to-south polarization clockwise in one semicircular half of the ring and counterclockwise in the other half. With the damper arranged to produce relative rotation between the magnet and ring, magnetic domains in the ring are reversed from clockwise to counterclockwise magnetization, and vice versa, with the consequent dissipation of energy in the ring due to magnetic hysteresis. Similar arrangements are used as a clutch, a brake, or a magnetic hysteresis drive.

A general object of the invention is to provide magnetic circuits which minimize the change in relative position required to produce the maximum force capability of systems of the general kind described, and thereby to reach the maximum energy dissipation as a function of further relative motion.

Another, and related, object of the invention is to minimize the dimensions of the circuits in the direction of the relative motion, and thereby facilitate the use of multipole configurations that produce a higher force and dissipate more energy as a result of multiple changes in magnetization.

The foregoing and other objects are realized according to the invention through the provision of magnetic hysteresis circuits comprising a magnetizing device and a magnetizable member so arranged that a minimum of relative motion between the device and member is required to reach the maximum hysteresis-derived force resisting this relative motion. Accordingly, minimum motion is required to attain the maximum energy dissipation. This invention achieves the property of requiring only a small relative motion for maximum effect by using a close spacing of the poles of the magnetizing device to produce a short reversal distance. The reversal distance may be defined as the distance from the center of a gap between a pair of poles to the center of the next adjacent gap where the direction of magnetization is reversed.

The concept of closely spaced poles cannot be defined in terms of specific dimensions, since the invention applies to any scale of apparatus. Closely spaced poles will generally be separated, however, by gap dimensions that are smaller than the width or length of the magnet associated with the magnetizing device and either equal to or smaller than the thickness of the magnet. The object of close pole spacing is to bring adjacent gaps, producing a reversal of magnetizing force, as close together as is consistent with the production of some specified hysteresis-derived force resisting relative motion. Therefore, a more basic definition of close spacing is one that minimizes, within the limits of practical complexities of construction, the relative displacement required to attain the specified hysteresis-derived force.

Close pole spacing also facilitates the use of multireversal arrangements for attaining higher values of maximum force and dissipation. In a multireversal arrangement of the magnetizing device, the first three pole faces forming two gaps of reversed direction of magnetization are followed by additional pole faces forming additional gaps of alternating direction of magnetization. Thus, when the magnetizable member is forced through the multiple reversed magnetizing fields, each reversal contributes to the total energy dissipation and increases the required force.

A feature that results in minimum relative motion to produce full magnetic hysteresis action in certain embodiments of the invention is the reduction of the width and spacing of pole tips to the extent that the pole tips of high-permeability material are saturated.

The property of attaining maximum hysteresis drag with minimum relative motion results in a minimum of reversed motion being required for full reversal of the drag force, i.e., maximum drag force in the opposite direction. This property is particularly important in the damping of oscillatory systems, since major hysteresis loops to the maximum force-reversal excursion are maintained down to smaller amplitudes; the system oscillation is consequently reduced to a very small amplitude before the regime is reached where less damping is obtained from minor hysteresis loops that do not reach the maximum force-reversal excursion.

Another feature of the invention is the magnetic shielding provided by certain embodiments of the multipole magnetizing device in which the outer pole pieces, and the case which forms a magnetic shield, have the same polarity. Further reduction in the stray magnetic field produced by the device is accomplished by certain shaded-pole versions in which the outer poles of a multiple magnetizing device are reduced in strength. Thus, the diminishing reversals of the magnetizing field reduce the magnetization of the variably magnetized member where it emerges from the vicinity of the magnetizing device.

Figure 1:
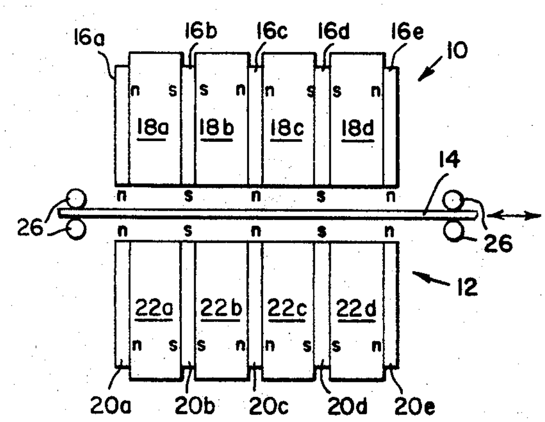
FIG. 1 is a front elevation showing one form of the magnetic hysteresis apparatus according to the invention.

Referring to the drawing, FIG. 1 shows a pair of multipole magnetizing devices 10 and 12 symmetrically facing the opposite sides of a movable hysteresis member or sheet 14 of magnetizable material. The device 10 comprises an ordered array of closely spaced magnetizing elements made up of a plurality of magnetic pole pieces **16*a*–16*e* interleaved with a plurality of permanent magnets 18*a*–18*d*. Similarly, the device 12 comprises a plurality of magnetic pole pieces 20*a*–20*e* with a plurality of permanent magnets 22*a*–22*d***.

The pole pieces and magnets may be held together by bonding, for example, or by other mechanical means that does not interfere with the magnetic circuits.

A typical selection of materials for the magnetic hysteresis apparatus would include magnets made of barium ferrite or an aluminum-nickel-cobalt alloy having a very high ability to retain a strong magnetization; and hysteresis member made of a material such as 3½% chrome steel that is easily magnetized yet capable of dissipating energy when subjected to a cycle of changing magnetization.

Figure 2:
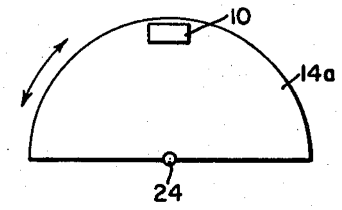
FIG. 2 is a plan view of the apparatus of FIG. 1 in which the member is a rotating vane.
Figure 3:
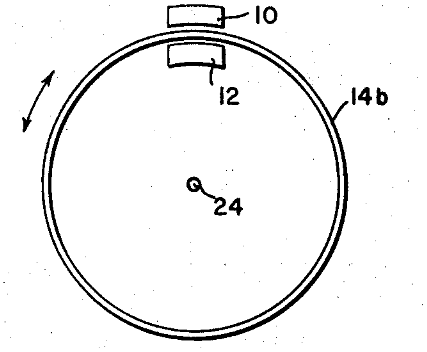
FIG. 3 is an elevation view of the apparatus in which the magnetizable member is a cylinder.

The arrangement of FIG. 1 may represent a system in which there is linear motion between the sheet 14 and devices 10 and 12. Alternatively, it may represent the developed section of a system in which there is rotational motion between the sheet 14 and devices 10 and 12. For example, as shown in FIG. 2, the sheet 14 may comprise a disc or vane rotating or oscillating between the devices 10 and 12, about an axis 24, between the device 10 on one side of the vane 14 and the device 12 on the other side of the vane 14, the device 12 being hidden in the figures by the device 10. In FIG. 3 the sheet 14 is shown as a cylinder rotating or oscillating between the devices 10 and 12 about the axis 24.

Referring again to FIG. 1, the forced relative motion that occurs during normal operation of the arrangement as a magnetic hysteresis drive, brake or damping system, is guided by a track, pivot or bearing system, shown as a number of oppositely located rollers 26, that keeps the magnetizable member 14 positioned midway between the magnetizing devices 10 and 12.

Adjacent pole pieces of each of the magnetizing devices 10 and 12 are oppositely magnetized by the magnets. For example, the face of magnet **18*a* adjacent the pole piece 16*a* is a north pole, making pole piece 16*a* a north pole, as shown, and the face of magnet 18*a* adjacent pole piece 16*b* is a south pole, making pole piece 16*b* a south pole. The face of magnet 18*b* adjacent pole piece 16*b* is a south pole and the face adjacent pole piece 16*c* is a north pole, making pole piece 16*c* a north pole. Thus pole pieces 16*a*–16*e*** are alternately magnetized north, south, north, south, and north in that order.

Similarly, pole pieces **20*a*–20*e* are also magnetized north, south, north, south, and north in that order, so that opposingly facing pole pieces, such as pole pieces 16*a* and 20*a***, are similarly poled.

With the magnetizable member 14 fixed in the positions shown, the magnetizing units formed by the interleaved pole pieces and magnets as above described, induce a given state of magnetization in the member 14. For example, one magnetizing unit is formed by the pole pieces **16*a* and 16*b* and the magnet 18*a*, and another magnetizing unit is formed by the pole pieces 20*a*, 20*b*, and magnetic 22*a*. This first, oppositely facing set of magnetizing units induces a state of magnetization in the adjacent portion of the ferromagnetic sheet 14 such that magnetic domains in this portion of the sheet are magnetized with a field produced by a north pole on the left and a south pole on the right. Similarly, the second set of magnetizing units are formed by pole pieces 16*b*, 16*c*, and magnet 18*b*, and pole pieces 20*b*, 20*c*, and magnetic 22*b*. But the portion of the ferromagnetic sheet between these two elements is magnetized with a field of opposite orientation as produced by a south pole on the left and a north pole on the right. The third pair of magnetizing units formed by pole pieces 16*c*, 16*d*, and magnet 18*c*, and pole pieces 20*c*, 20*d*, and magnet 22*c* create a field oriented as that produced by the first set and finally the fourth pair of magnetizing units formed by pole pieces 16*d*, 16*e*, and magnet 18*d* and pole pieces 20*d*, 20*e*, and magnet 22*d*** create the again reversed orientation as produced by the second set.

When the variably magnetized member 14 is moved from left to right, the magnetizing force impressed on any particle or domain in the member 14 is changed. For example, as a domain is moved from a position in front of magnet **18*b* to a position in front of magnet 18*c*, the impressed magnetizing force is reversed, the magnetizing force having passed through zero at the central plane of the symmetrically forcing north poles 16*c* and 20*c*. Further motion of the domain to a position in front of magnet 18*d*** reverses the magnetizing force again and completes a full cycle of variable magnetization.

Now it is common to all unsaturated magnetic materials that a change in magnetization lags the variation in magnetizing force to produce a hysteresis loop that is a measure of energy loss in the material, By conservation of energy, the energy loss that occurs as the magnetizable member 14 is moved between the magnetizing units in the apparatus shown, is manifest as a force being required to move the member 14 relative to the magnetizing devices.

Figure 4:
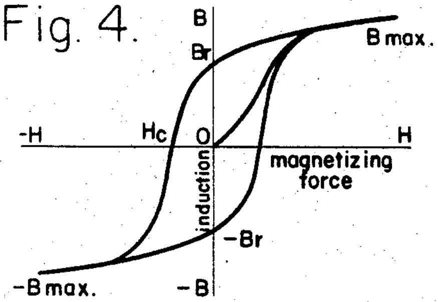
FIG. 4 is a graph showing a hysteresis curve.

Reference is now made to FIG. 4 which is a graph showing how the magnetic induction B in a magnetic material changes as the magnetizing force H is varied.

When demagnetized material is subjected to a gradually increasing magnetizing force up to $H_{max}$, the induction in the material increases from zero to $B_{max}$. If the magnetizing force is then gradually reduced to zero, the induction decreases from $B_{max}$ to $B_r$ on the vertical axis. This value ($B_r$) is known as the residual induction.

If the magnetizing force is reversed in direction and increased in value, the induction in the material is further reduced, and it becomes zero when the demagnetizing force reaches a value of $H_c$, known as the coercive force. A further increase of this negative force causes the induction to reverse direction, becoming $-B_{max}$ at $-H_{max}$. If the magnetizing force is reversed and increased from this point to $H_{max}$, the change in induction is along curve $-B_{max}$, $-B_r$, $B_{max}$. This gives the complete hysteresis loop.

This type of curve applies to all magnetic materials, the difference in materials being largely a matter of the values. Materials having a low coercive force are low-energy materials, and those having a high coercive force are high-energy materials. These have been commonly known as soft and hard materials, respectively, but the terms low-energy and high-energy are more representative of the characteristics of the magnetic materials.

As the magnetizable member 14 is moved between the magnetizing devices 10 and 12, the magnetic domains in the member 14 experience changes in magnetization which define a hysteresis loop similar to that shown in FIG. 4. The area under the hysteresis loop is a measure of the energy loss in the member 14.

With the action described above being kept in mind, it is now possible to more fully describe the force-deflection characteristics of the device. The nature of this action is principally governed by the north-south-north-south repetitive arrangement of the pole faces. Neglecting effects of magnetization lag and fringe fields, ½ cycle of motion, represented for example by a domain moving from the central plane of magnet 18$b$ to the central plane of magnet 18$c$ is required for the force producing the relative motion to attain its maximum value. Further differential motion thereafter requires this same constant force since each unit deflection causes the same number of magnetic domains to complete a cycle or go through the state of magnetic induction where energy dissipation takes place. As the direction of relative motion is reversed, ½ cycle of reversed motion is required (a domain which had arrived at the central plane of magnet 18$c$ now moves back to the central plane of magnet 18$b$) for a complete reversal of the force such that the same constant maximum force in the opposite direction is required. Magnetization lag in the magnetic member (i.e., the lag in the changes in magnetization behind the variations in the magnetizing force) would cause some increase in the ½ cycle of motion to obtain the above mechanical effects; but the increase due to lag would not extend the total required motion to more than one cycle. Because of this behavior, close pole spacing is advantageous in the usual application where a short travel for maximum force is desired; and a small gap between the magnetizing devices and the magnetizable member is used to reduce fringe fields and obtain maximum benefit from the close pole spacing.

It will now be appreciated that if the magnetizable member 14 is subjected to oscillatory motion such as that produced by the librations of a satellite, the apparatus shown in FIG. 1 will damp the motion by virtue of the energy absorption in the member 14 due to histeresis losses.

Figure 6:
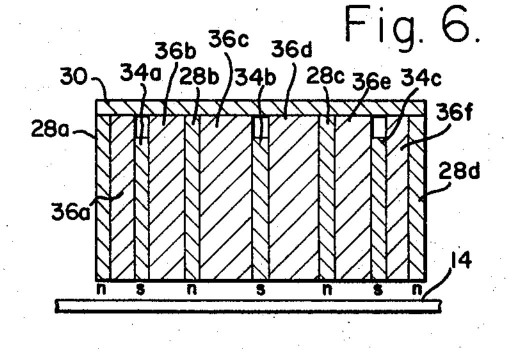
FIG. 6 is a section taken along line 6—6 of FIG. 5.
Figure 5:
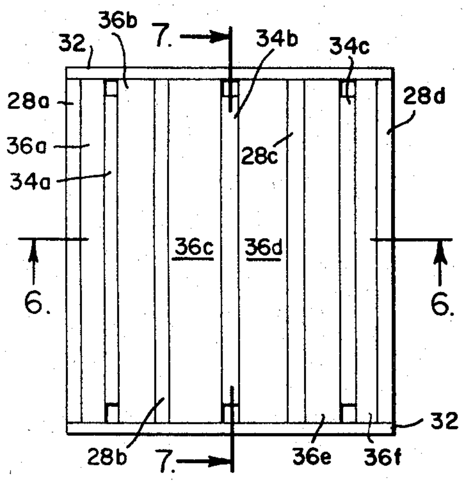
FIG. 5 is a plan view showing a modified form of the apparatus provided with magnetic shielding.
Figure 7:
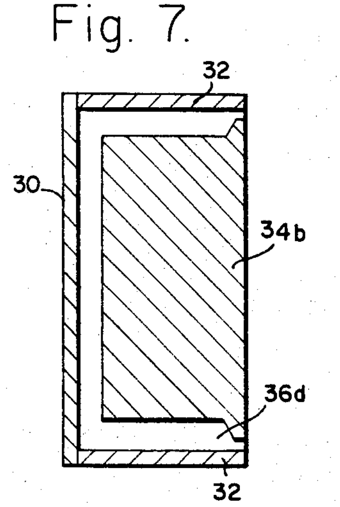
FIG. 7 is a seciton taken along line 7—7 of FIG. 5.

Fringe and end effects are minimized and better magnetic shielding is provided by the configuration shown in FIGS. 5, 6, and 7. In this and other repetitive multipole magnetizing elements, the end effect is reduced by using 3, 5, 7 or other odd numbers of pole pieces so that the end pole pieces (e.g., 28$a$ and 28$d$) have the same polarity. This also allows connecting the odd numbered pole pieces 28$a$–28$d$ together with a backshield 30 and side shields 32 of a highly permeable material to form a complete shielding box as shown. The even numbered pole pieces 34$a$–34$c$ are spaced from the shields 30 and 32 to avoid short circuiting.

The design shown in FIGS. 5–7 illustrates that the space allocated to the shielding box might be completely filled with magnet material, such as magnets 36$a$–36$f$. Then, for the box volume and pole spacing used, maximum flux is induced in the magnetizable member 14 and maximum hysteresis drag capability is obtained.

Although only one magnetizing device is shown or required in some applications, the duplicate, symmetrically facing device is often warranted to increase the drag, improve the shielding, and provide a central position for the vane where the lateral magnetic attracting forces are balanced. This also provides a plane or planes of symmetry where the impressed magnetization force is zero and thereby insures that a dissipative hysteresis loop is traversed.

Should it be required that the magnetic hysteresis apparatus produce minimum external field, the case might be extended to cover the magnetizable member at its widest excursion or a shaded-pole magnet assembly might be used. If the magnetizable member 14 of FIG. 5 is magnetized appreciably by the end magnets 36$a$ and 36$b$ in the repetitive array, it will emerge with residual magnetism. This can be reduced, however, by using the shaded-pole arrangement in which the force of the impressed magnetizing cycles are decreased as the ends of the array are approached. The reduced strength of the magnets might be accomplished by any appropriate means but reduced pole spacing would be advantageous to the force-reversal characteristics.

Figure 10:
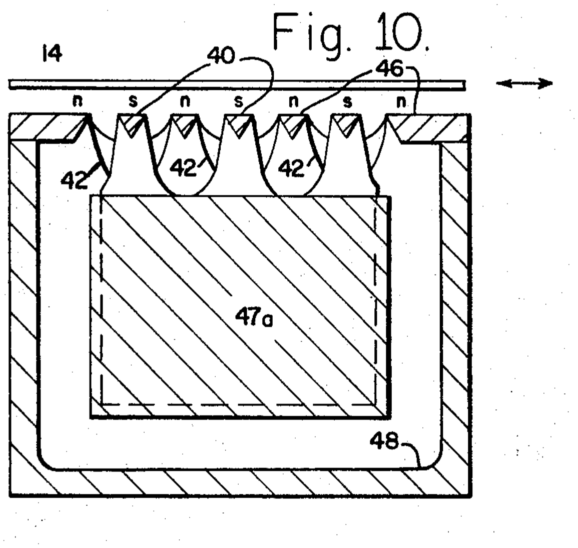
FIG. 10 is a section taken along line 10—10 of FIG. 8.
Figure 8:
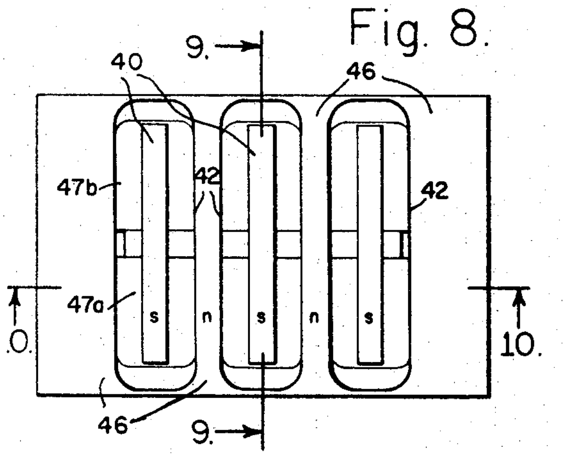
FIG. 8 is a plan view showing another form of the apparatus.
Figure 9:
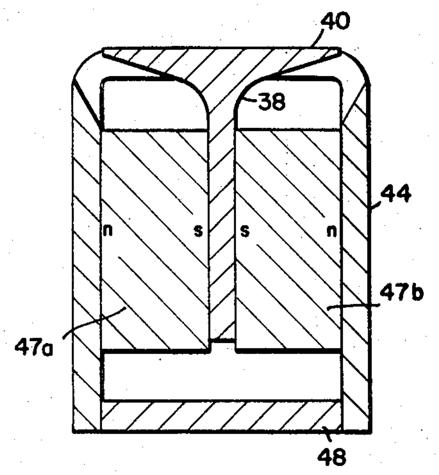
FIG. 9 is a section taken along line 9—9 of FIG. 8.

Another embodiment of the shielded magnetizing element is shown in FIGS. 8, 9 and 10. In this embodiment, the teeth of a U-shaped and a T-shaped element are interleaved to form multiple pole faces. This configuration can be dimensioned for very close pole spacing without using correspondingly short magnets; and furthermore, only two magnets are used regardless of the number of teeth cut to produce the north-south-north repetitive pole array. It also illustrates a more efficient utilization of the magnet material by use of a shielding case with less shunting of the field developed by the magnets.

Referring to the figures, the teeth of a slotted, T-section element 38 form multiple pole faces 40 of one polarity that project through slots 42 in a U-shaped element 44, the teeth of which form the multiple pole faces 46 of the other polarity. The magnets 47$a$ and 47$b$, are oriented so that the element 44, forming the sides and slotted face of the case, is contacted by the magnet faces of one polarity while the central element 38 is contacted by the magnet faces of the other polarity. The width of the pole faces of one polarity on the T-shaped element 38, the width of the adjacent pole faces of the other polarity as formed by the bars between the slots in element 44, and the gap between the pole faces 40 and 46 of opposite polarity can be varied to control the coupling to the magnetizable member 14 and thereby to change the drag force and force reversal characteristics. The shielding box is completed by a U-shaped element 48 which closes the back and the ends of the slotted U-shaped element 44. In this assembly, an efficient utilization of magnet material is illustrated since the case is well separated from all materials of opposite polarity.

Figure 11:
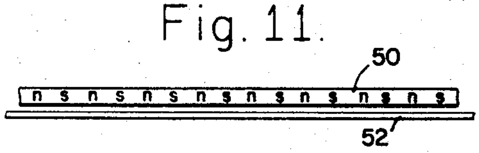
FIG. 11 is a front elevation showing another form of the apparatus.

A simple embodiment of the repetitive, north-south-north magnetizing device is shown in FIG. 11 where this device 50 is a sheet, disk, or tape of hard magnetic material having the permanent magnetic pattern impressed on it. The adjacent magnetizable member 52 of a softer magnetic material is variably magnetized with the consequent dissipation of its hysteresis losses as the device 50 and member 52 are forced into relative motion. The drag force can be increased, not only by increasing the length of the magnetizing device 50 and the number of the reversals in the direction of motion, but also by expanding the pair to a stack of alternate devices and members. Furthermore, in this as well as in other embodiments of the invention, the drag might be increased by allowing some Coulomb-friction drag between the device 50 and member 52. In this case the magnetic attraction between the device 50 and member 52 might be used as part or all of the normal force between the friction surfaces.

Figure 12:
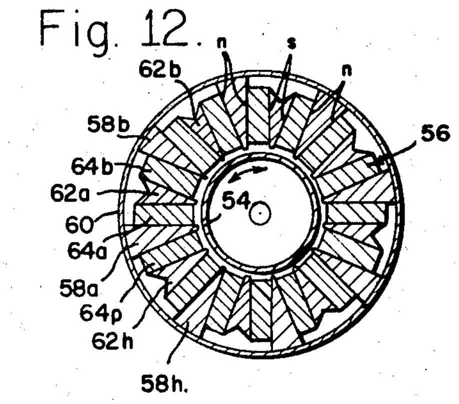
FIG. 12 is a sectional view showing another form of the apparatus.

FIG. 12 illustrates the use of any of the former repetitive, north-south magnetizing members as a configuration of revolution for producing a torque when the magnetizing and the magnetized members are subjected to relative rotary motion. The configuration of revolution is applicable for a circular disk or conically shaped magnetizable member as well as for a cylindrical member, however, in the cylindrical configuration the magnetic attraction forces are balanced out without the necessity of having a magnetic drive member on both sides of the magnetizable member.

Referring again to FIG. 12, the magnetizable member 54 is in the form of a thin-walled cylindrical shell that rotates about its axis to establish relative motion with respect to the remainder of the assembly which forms the magnetizing device 56. This latter device 56 is composed of four types of elements arranged symmetrically around the central magnetizable member 54. Pole piece wedges 58*a*, 58*b* . . . 58*h* of one polarity have pole tips facing the central member 54 while their outer surfaces contact an exterior shielding cylindrical shell 60. Pole piece wedges 62*a*, 62*b* . . . 62*h* of the other polarity face the central member 54 in a similar manner but their outer surfaces are isolated from the shielding case or shell 60. The latter wedges 62*a*–62*h* are grooved at their outer surface to avoid leakage to the shell 60. The two types of pole pieces alternate circumferentially while being separated by the intervening magnets 64 which are oriented to establish the opposite polarities for the alternate pole tips.

Figure 13:
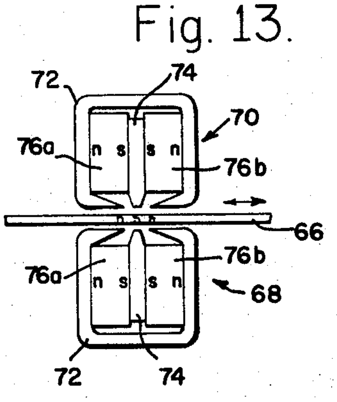

In FIG. 13, an embodiment of the invention is shown in which the variably magnetizable member 66 is subjected to a single forced reversal of magnetization; but the motion required for this reversal has been minimized. The magnetizing devices 68 and 70 differ from the configuration of FIG. 5 in that the many reversals are sacrificed in favor of closer pole spacing in the direction of relative motion. This allows maximum potentialities for obtaining a short travel for reversal of the hysteresis drag force. The shortest reversal distance is obtained by reducing the pole spacing to such an extent that the required drag force can only be obtained by operating high permeability pole tips at saturation.

As shown in FIG. 13, each of the magnetizing devices 68 and 70 has an element 72 that acts as the shielding case which wraps around the assembly to terminate in the two outer pole tips of common polarity. The narrow pole piece 74 of opposite polarity is held by the magnets 76*a* and 76*b* between the two closely spaced outer pole tips. The tips of the pole pieces 72 and 74 are tapered or beveled to impress a narrow north-south-north magnetizing field on the magnetizable member 66. In one variation of this configuration, shown in FIG. 14, the outer pole pieces 77 are applied as an overlay after the shielding case 79, magnets 76*a* and 76*b* and center pole piece 74 are assembled. This allows variation of the magnetic gap to be used more conveniently in the adjustment of the hysteresis drag developed.

Figure 14:
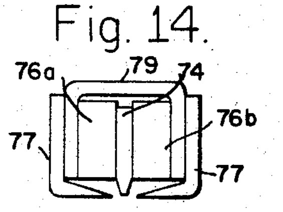
FIGS. 13–15 are elevation views showing forms of the apparatus utilizing tapered pole tips.
Figure 15:
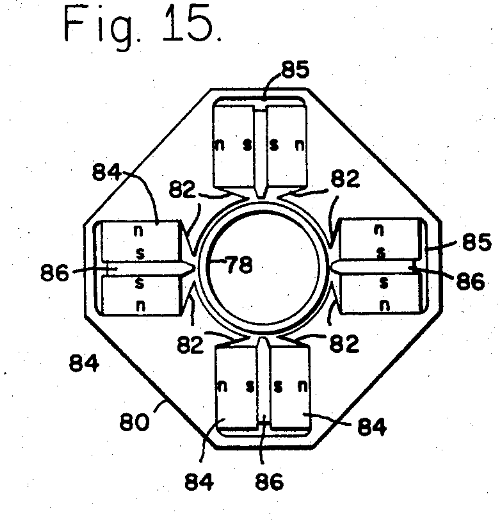

FIG. 15 illustrates both the repetitive use of the minimum-gap-width members similar to that shown in FIGS. 13 and 14 and the configuration-of-rotation arrangement used for producing a torque during relative rotation. The thin-walled cylindrical shell 78 used as the variably magnetizable member would require a minimum of reversed relative rotation for reversal of the torque. Again, as was the case for FIG. 12, this configuration-of-revolution arrangement is also applicable for a circular disk or conically shaped magnetizable member.

In FIG. 15, the shielding case and the pole piece of one polarity are combined as one element 80. The element 80 is suitably cut or otherwise shaped to form a plurality of tapered pole faces 82 circumferentialy arranged around the shell 78. The magnets 84, disposed in openings 85 in the element 80 hold the narrow tapered pole pieces 86 of opposite polarity between the gaps in the tapered pole faces 82. The reversal of the magnetization of the cylindrical shell 78 takes place in the narrow limits of the north-south-north pole spacing.

Figure 16:
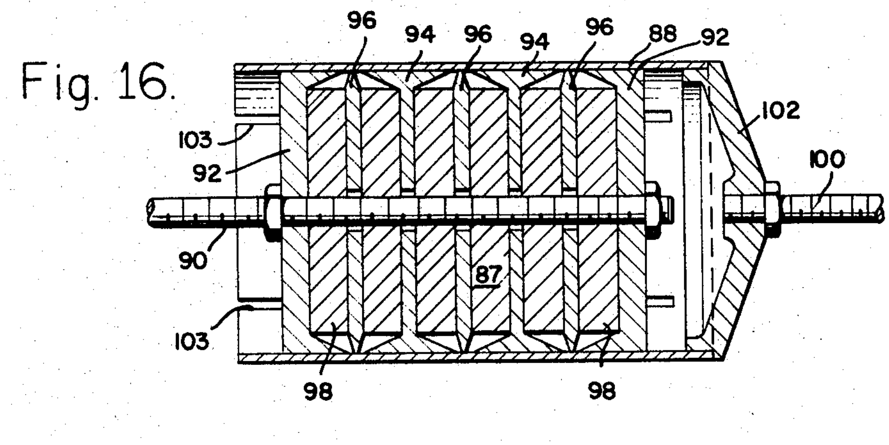
FIGS. 16 and 17 are sectional views showing other forms of the apparatus utilizing tapered pole tips.

In FIG. 16 is shown an embodiment of the invention in which the narrow pole spacing of FIG. 13 is retained but the multi-element assembly is intended for linear relative motion. Such an assembly might be used as a damping member attached between two points in a spacecraft structure or mechanism.

Referring to FIG. 16, a cylindrical magnetizing device 87 is disposed within a hollow cylindrical magnetizable member 88. A magnet assembly rod 90, preferably of nonmagnetic material, clamps the end pole pieces 92 at each end of a stacked array of circular plates or disks which form the magnetizing device 87. The device 87 includes end pole pieces 92 and intermediate pole pieces 94 of the same polarity, the narrow pole pieces 96 of the opposite polarity, and the magnets 98. The rims of the pole pieces 92, 94, and 96 are suitably shaped to form tapered pole faces which converge towards restricted areas of the magnetizable member 88. The magnetizable member 88 is operated by a rod 100 attached to a plate 102 closing one end of the member 88. With the pole pieces 94 and 96 in contact with the magnetizable member 88, as shown, some friction drag would be added to the magnetic hysteresis drag, but the friction could be minimized when desired by guiding the reciprocating motion by a low-friction system such as that provided by separate flexure members connecting the magnetizable member 88 and the assemby rod 90. Alternatively, the member 88 may be provided with longitudinal slits 103, as shown, to permit the member 88 to flex as it is moved relative to the device 87.

Figure 17:
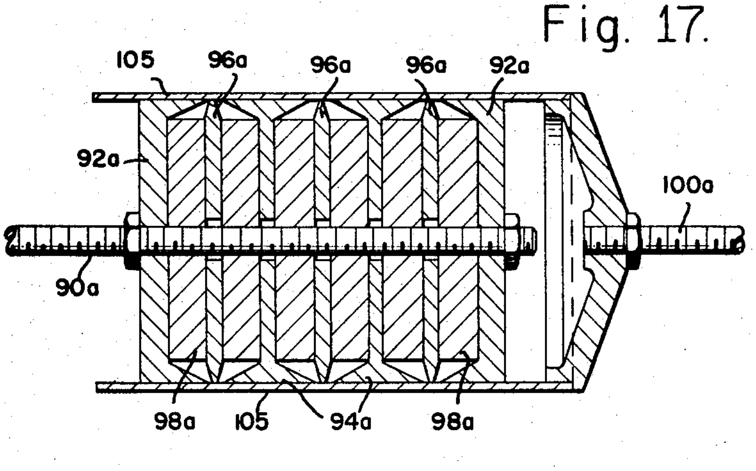

FIG. 17 shows apparatus similar to that of FIG. 16 except that the magnetizing device 87*a* is formed of rectangular elements disposed between two flat rectangular magnetizable members 105. The magnetizing device includes end pole pieces 92*a* and intermediate pole pieces 94*a* of the same polarity, narrow pole pieces 96*a* of the opposite polarity, and magnets 98*a*. The two ends of pole pieces 92*a*, 94*a*, and 96*a* in contact with the magnetizable members 105 are suitably beveled to form the closely spaced poles.

Figure 18:
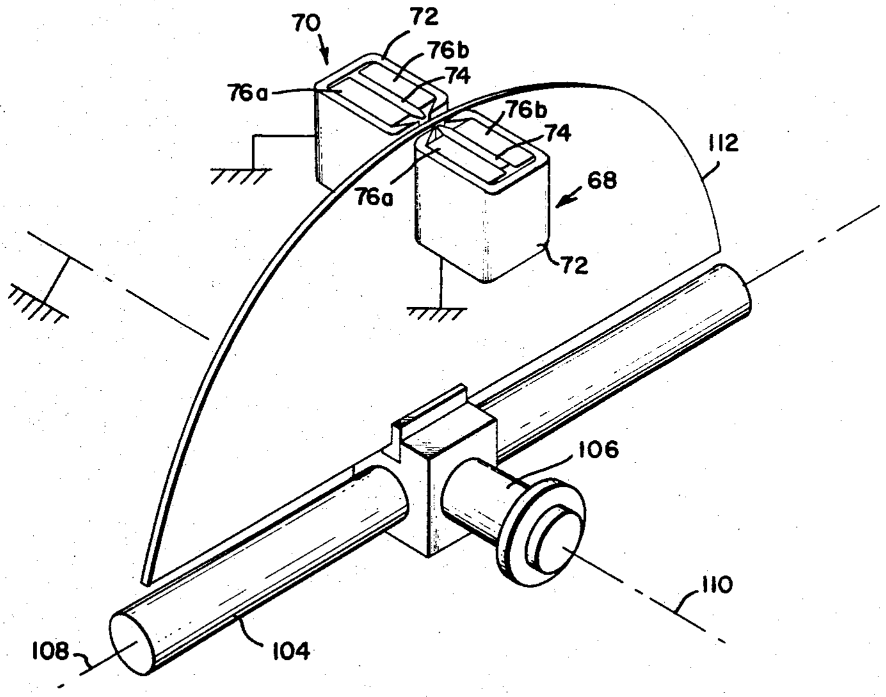
FIG. 18 is a perspective view of a satellite structure incorporating magnetic hysteresis damping apparatus according to the invention.

FIG. 18 shows a magnet hysteresis damper incorporated in a satellite structure utilizing a gravity gradient stabilization system. Only those portions of the satellite structure are shown which afford an understanding of the damping mechanism.

The satellite structure includes an inertia boom 104 fixed to a rotor 106 and having a longitudinal axis 108 at right angles to the axis 110 of rotation of the rotor 106. A vane 112 of ferromagnetic material is clamped to the boom 104 and rotor 106 with its plane at right angles to the rotation axis 110 of the rotor 106. The vane 112 is shaped in the form of a segment of a circle having its center coinciding with the rotation axis 110.

A pair of magnetizing devices 68 and 70 are located on opposite sides of the vane 112 adjacent to the periphery thereof. The magnetizing devices 68 and 70 are fixed relative to the rotational axis 110, as indicated schematically by ground lines.

The magnetizing devices 68 and 70 may comprise one of the number of arrangements already shown and described. However, the arrangement of FIG. 13 is shown for illustration.

When the satellite structure is in orbit, the librations of the satellite cause the boom 104 to oscillate about the rotational axis 110. As the boom 104 oscillates the vane 112 also oscillates between the magnetizing devices 68 and 70. The energy of oscillation is absorbed in the ferromagnetic vane 112 through the mechanism of hysteresis damping as above-described, so as to cause the oscillations to stop.

For any of the embodiments of the invention, it is intended that complete magnetic shielding of the magnetizable member as well as the magnetizing members be provided where necessary either to protect the damping device itself from external fields or to prevent stray fields from being produced by the device.

The various embodiments of the invention all make use of a magnetization lag in the magnetizable hysteresis member that takes place when some movement causes a change in the magnetizing field. After sufficient change in the vicinity of any magnetic domain, the stress causes a change of state that results in dissipation of energy. The force-displacement characteristics of the different forms of apparatus all show a force buildup with displacement as the magnetic lag is developed; and then the force is limited to some constant value after the displacement reaches the point where further increments cause equal numbers of domain to reach the stress causing dissipation of energy. The value of the force opposing further motion is such that the energy input is equal to the dissipation.

For the various magnetic domains in the magnetizable member, the applied magnetic field vector might vary in magnitude, in direction, or in both magnitude and direction. It is necessary that at least part of the variation be at magnitudes smaller than that value which causes saturation. Above saturation, there is no hysteresis loss due to changes in either magnitude or direction of the applied field; consequenty motions effecting such changes do not result in an opposing force. Excess field strength should therefore be avoided, especially for hysteresis devices in which the field change is primarily that of rotation. For the usual designs where both magnitude and direction are changing, excess field strength is not a problem. Furthermore, the configurations with symmetrically facing magnetizing members as shown in FIGS. 1 and 13 have planes of zero magnetizing force through which all the hysteresis material passes. This insures that a dissipative hysteresis loop is traversed regardless of the maximum value of the field strength applied.

The embodiments of the invention in which an exclusive property or privilege is claimed are defined as follows:

1. Magnetic hysteresis apparatus for damping oscillatory motion comprising:

a magnetizable member capable of dissipating energy in response to changes in its state of magnetization;

a magnetizing device having a sequential array of pole pieces of alternating polarity arranged to induce magnetic states of alternating polarity in said member, a permanent magnet associated with each pole piece, the pole tips of adjacent pole pieces being separated by gaps substantially smaller than the width of the permanent magnet associated with each pole piece, each pole tip being shaped to minimize the spacing between pole tip centers;

and means for providing relative oscillatory motion between said member and said device in a direction in which said poles are sequentially arranged, whereby the relative displacement between said member and said device required to produce maximum energy dissipation in said member is minimized.

2. The invention according to claim 1, wherein said magnetizable member is annular, and said magnetizing device comprising an annular array of an even number of pole faces of alternating polarity encompassing said member;

said member and device being mounted for relative rotation.

3. The invention according to claim 1, wherein the poles of one polarity are formed from a multigrooved member and the poles of the opposite polarity are formed of a multislotted member meshed with said multigrooved member.

4. The invention according to claim 1 and further including a second magnetizing device aligned with and spaced from said first mentioned magnetizing device, said member being disposed therebetween, whereby said magnetizable member has induced therein planes of substantially zero magnetizing force interspersed between regions of applied magnetizing force.

5. The invention according to claim 4 wherein said means for providing relative oscillatory motion comprises an inertia boom of a satellite structure, said inertia boom being attached to said magnetizable member and being adapted for transmitting librations of the satellite to said magnetizable member, thereby providing relative oscillatory motion between said magnetizable member and said magnetizing device.

6. The invention according to claim 1 wherein said magnetizing device further includes magnet shielding means joining the end pole pieces of said array and enclosing the remainder of the array and the permanent magnet associated with each pole piece on all sides except that side adjacent said magnetizable member, the remainder of the array and the permanent magnet associated with each pole piece being spaced from said magnetic shielding means.

7. Magnetic hysteresis apparatus comprising:

a magnetizable member capable of dissipating energy in response to changes in its state of magnetization;

a magnetizing device including a central pole piece formed with a narrow pole face of one polarity, a pair of pole faces of the opposite polarity, one on each side of said first mentioned pole face and separated therefrom by narrow gaps, a pair of spaced magnets associated with said pole faces, said gaps being substantially narrower than the smallest dimension of said magnets;

means joining said two adjacent pole faces and forming a shielding case encircling said magnets and said central pole piece, said central pole being spaced from said shielding case;

and means for providing relative motion between said member and said device in the direction in which said pole faces are spaced.

8. Magnetic hysteresis apparatus comprising:

a magnetizable member capable of dissipating energy in response to changes in its state of magnetization;

a magnetizing device including means forming a narrow beveled pole face of one polarity separated by narrow gaps on each side from two adjacent internally beveled pole faces of the opposite polarity arranged at right angles to said first mentioned pole face, a pair of spaced magnets associated with said pole faces, said gaps being substantially narrower than the smallest dimension of said magnets, all of said pole faces being formed of highly permeable material;

and means for providing relative motion between said member and said device in the direction in which said pole faces are spaced, said gaps being of such reduced dimensions that when said member is moved relative to said pole faces, a hysteresis derived drag force of a predetermined required magnitude is produced therebetween only when the pole faces are at the saturation level of said highly permeable material.

9. Magnetic hysteresis apparatus comprising:

a planar magnetizable member of extended surface dimensions;

and a magnetizing device coupled to said member and including a pair of permanent bar magnets, and an elongated pole piece sandwiched therebetween and arranged substantially normal to a surface of said members;

said pole piece terminating in a beveled end closely adjacent to said surface, a U-shaped pole piece element wrapped around said magnets and spaced from the end of said elongated pole piece opposite from the beveled end, a pair of opposed beveled pole tips overlying the ends of said pole piece element and extending normal to said pole piece, with said pole tips and said beveled end of the elongated pole piece converging in closely spaced apart relation towards a confined region of said member surface, said magnets being arranged to establish magnetic states of opposite polarity in said elongated pole piece and said pole tips, said magnetizable member and said magnetizing device being mounted for relative motion across said pole tips and beveled end.

10. The invention according to claim 9, and further including another magnetizing device located adjacent the opposite surface of said magnetizable member in alignment with said first mentioned magnetizing device.

References Cited

UNITED STATES PATENTS

| | | | |
|---|---|---|---|
| 1,960,915 | 5/1934 | Morse | 310—93 |
| 2,237,142 | 4/1941 | Holtz | 324—137 |
| 2,745,974 | 5/1956 | Oetzel | 310—93 |
| 3,176,174 | 3/1965 | Bolyard | 310—93 |
| 3,282,532 | 11/1966 | Tinling et al. | 244—1 |
| 2,603,678 | 7/1952 | Helmer | 310—93 |
| 3,034,744 | 5/1962 | Bancroft | 310—93 X |

FERGUS S. MIDDLETON, *Primary Examiner.*

U.S. Cl. X.R.

188—161; 310—93